United States Patent [19]

Peilloud et al.

[11] 4,384,053
[45] May 17, 1983

[54] PRODUCT FOR MANUFACTURING CLUTCH OR BRAKE LININGS, AND METHOD OF PREPARING SAME

[75] Inventors: Fernand Peilloud, Hery sur Alby; Gerard Gladel, Garges les Gonesse, both of France

[73] Assignees: Societe Nouvelle de Roulements, Anncey Cedex; Regie Nationale des Usines Renault, Boulogne Billancourt, both of France

[21] Appl. No.: 225,533

[22] Filed: Jan. 16, 1981

Related U.S. Application Data

[63] Continuation of Ser. No. 48,251, Jun. 13, 1979, abandoned.

[30] Foreign Application Priority Data

Jun. 20, 1978 [FR] France .............................. 78 18357

[51] Int. Cl.³ .......................... C08K 3/14; C08K 7/00
[52] U.S. Cl. ................................ 523/153; 75/126 R; 523/155; 524/594
[58] Field of Search ..................... 260/37 M, 38 R; 523/152, 153, 155

[56] References Cited

U.S. PATENT DOCUMENTS

| | | | |
|---|---|---|---|
| 3,069,758 | 12/1962 | Wulff | 428/74 |
| 3,390,750 | 7/1968 | Albertson | 192/107 |
| 4,003,716 | 1/1977 | Steigelman | 260/37 M |
| 4,111,891 | 9/1978 | Reynolds, Jr. | 260/38 |
| 4,119,591 | 10/1978 | Aldrich | 260/38 |
| 4,145,223 | 3/1979 | Iwata | 106/36 |
| 4,146,527 | 3/1979 | Yamamoto | 260/38 |
| 4,150,011 | 4/1979 | Searfoss | 260/38 |
| 4,175,070 | 11/1979 | Klein | 260/38 |
| 4,226,759 | 10/1980 | Chester | 260/38 |

FOREIGN PATENT DOCUMENTS

2323725   4/1977  France ................................ 260/38

*Primary Examiner*—C. A. Henderson
*Attorney, Agent, or Firm*—Fleit & Jacobson

[57] ABSTRACT

Product usable for manufacturing industrial articles such as friction linings for clutches and brakes. This product comprises a fine fibrous steel powder having a loose density of 0.2 to 1.5 g/c.c. with a carbon content of 0.95 to 1.10% by weight, the chromium content by weight ranging from 1.30% to 1.60%. The powder has a micrographic structure which, when observed in a plane intersecting a metal particle, shows a fine distribution of iron and chromium spherular carbides having the formula $(Fe, Cr)_3 C$ in a mixed high-strength martensite and deformable austenite matrix.

7 Claims, 5 Drawing Figures

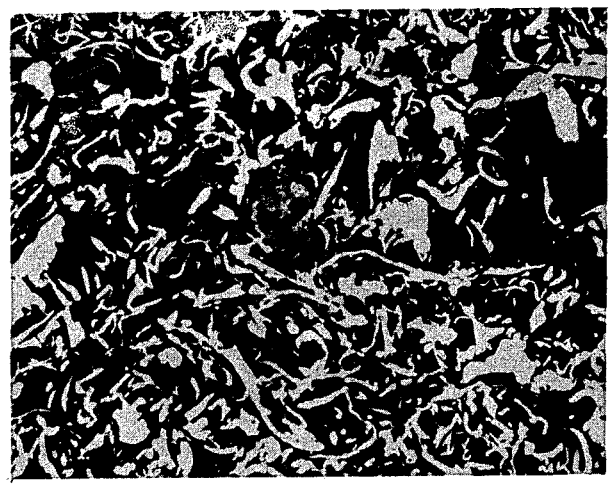
FIG_1
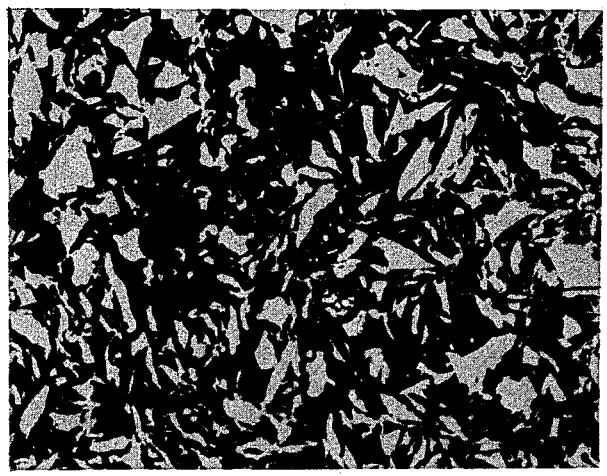
FIG_2
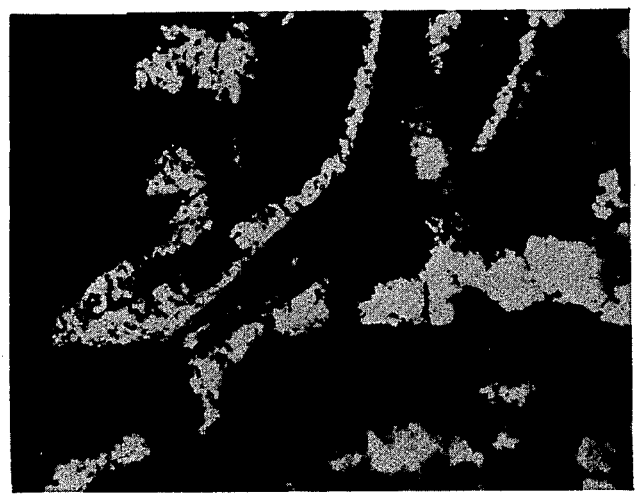
FIG_3

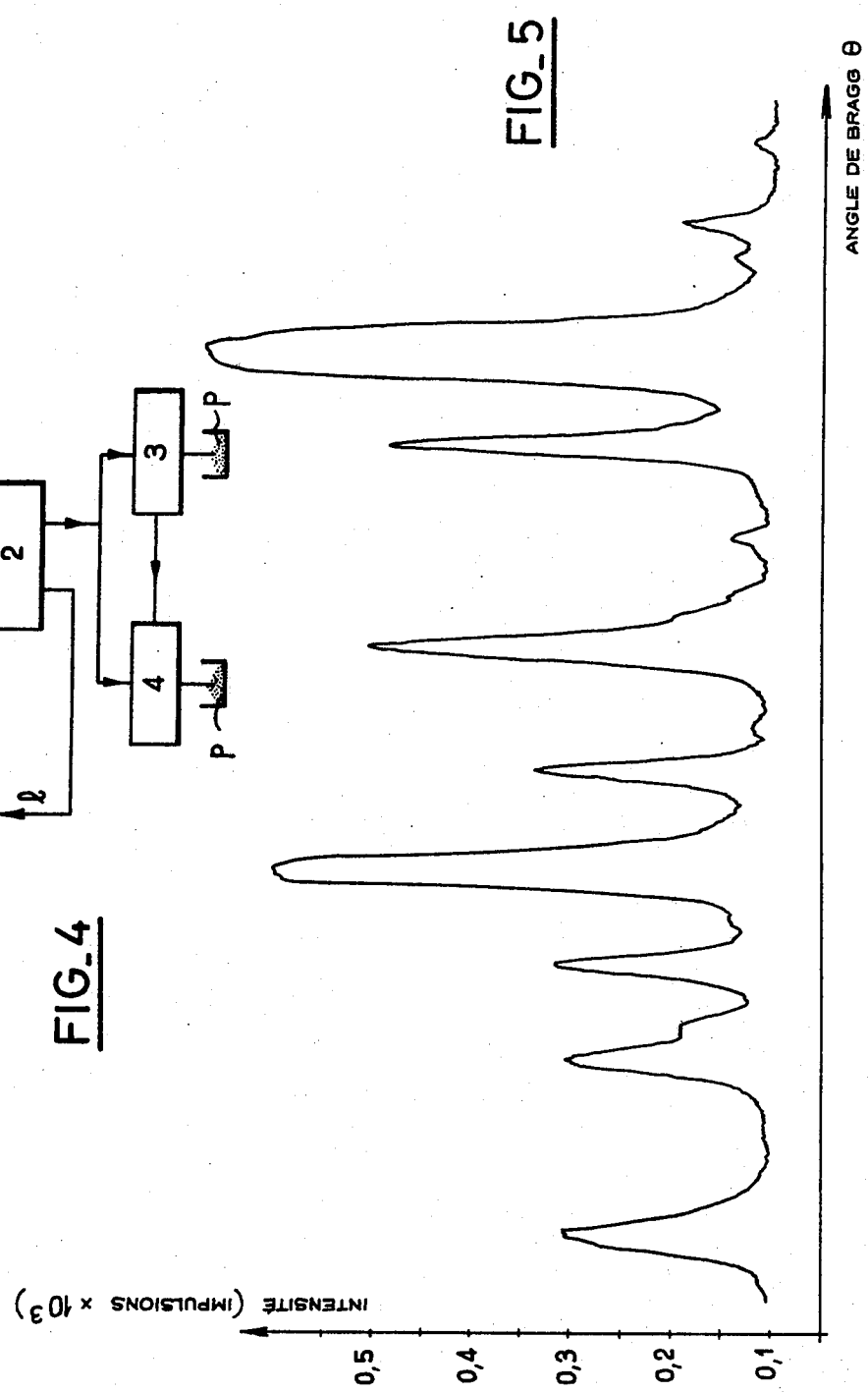

PRODUCT FOR MANUFACTURING CLUTCH OR BRAKE LININGS, AND METHOD OF PREPARING SAME

This is a continuation of application Ser. No. 48,251, filed June 13, 1979, now abandoned.

BACKGROUND OF THE INVENTION

1. Field of the Invention

This invention relates to a product usable for making industrial components such as friction linings for clutches or brakes.

2. Description of the Prior Art

Inorganic, e.g. metallic friction products are already known which, when fixed in the form of linings to supports, constitute so-called friction linings.

In metal-base friction linings, the substances controlling the friction and/or slip properties and the physical properties thereof are embedded in a sintered metal bond. Therefore, these linings are generally manufactured by applying the techniques of powder metallurgy from a mixture of metal and non-metallic powders which is applied to a support before sintering same in a suitable oven or under pressure.

The most common linings nowadays consist of a mixture having a high content of asbestos fibres, elastomer or metal chips, with a possible addition of substances capable of imparting specific properties to the lining. These additional substances may be for instance carbon for preventing variations in the coefficient of friction; alumina or silica for preventing the transfer of material from the rotating part to the lining; certain high-temperature inorganic salts permitting the stabilisation of the coefficient of friction at high temperatures. The cohesion of the lining compound is obtained by using a suitable thermostable resinoid binder. High-temperature linings used notably in aircraft comprise a copper or iron metal base and some of the additional elements mentioned hereinabove. Sometimes other additives are also incorporated in the lining compound in order to promote the sintering thereof and improve its high-temperature resistance.

Asbestos-free semi-metallic linings now marked out for a considerable growth are obtained from comminuted metal with the addition of the above-mentioned substances. In this case, the lining cohesion is obtained by using a thermostable resinoid binder.

The metal particles used for making these last two types of linings are obtained when the basic metal is iron by applying either a powder metallurgy process or a fibrous-product making process.

SUMMARY OF THE INVENTION

According to this invention, the product contemplated consists of a fine fibrous steel powder having in the loose state a density ranging from 0.2 to 1.5 g/c.c., this powder having a carbon content by weight within the range of 0.95 to 1.10%, and a chromium content by weight within the range of 1.30 to 1.60%, this powder being heat-treated in such a manner than the micrographic structure observed on an examination plane intersecting a metal particle displays a fine distribution of spherular iron and chromium carbides, having the formula $(Fe, Cr)_3 C$ in a mixed high-strength martensite and deformable austenite matrix.

Then additives are incorporated in this powder for imparting specific properties thereto, notably in connection with the regularity or stability of the coefficient of friction, the preservation of its stability at high temperature, as well as additives for facilitating the powder sintering process in case the powder is intended for making sintered friction linings, or thermostable organic resins imparting a good cohesion to the material when the latter is intended for making semi-metallic friction linings.

With the above-mentioned fibrous powder, having a relatively low density within the range of 0.2 g/c.c to 1.5 g/c.c., products in which the particles are separated by a relatively large free volume can be manufactured.

By obtaining a powder having a fibrous texture the bonding of the fibres with one another is considerably better than that resulting from the use of granular powders. Moreover, since the bonding of the possible additives is greatly improved, the linings have a higher mechanical strength.

BRIEF DESCRIPTION OF THE DRAWING

Reference will now be made to the accompanying drawings, in which:

FIGS. 1, 2 and 3 illustrate highly-magnified samples of fibrous powders;

FIG. 4 illustrates the different steps of the powder manufacturing process, and

FIG. 5 illustrates the X-ray diffraction diagram of a powder sample.

DESCRIPTION OF THE PREFERRED EMBODIMENT

Referring first to FIGS. 1 and 2, the powder for manufacturing clutch or brake linings according to this invention comprises steel fibres containing 0.95% to 1.10% of carbon and 1.30% to 1.60% chromium. In this texture, abrasive residues (r) can be seen. These elements (r) are particles detached from a grinding or abrasion tool implemented during the first phase (1) of the powder manufacturing process, which consists of a grinding-wheel abrasion operation applied to a primary industrial product such as a steel bar having the above-mentioned contents.

During this operation, the steel fibres are removed from the primary product from which it is desired to obtain a powder.

This operation is carried out under a stream of cooling liquid "l" containing anti-corrosion additives to prevent firstly an excessive oxidation of the particles at high temperature, and secondly the aggegration of the particles by the liquid.

This abrasion operation is carried out in such a manner that the particles torn from the surface of the primary product are brought instantaneously to a temperature generally close to 900° C. The cooling effect produced by the liquid causes each particle of 1% C and 1.5% Cr steel to undergo a quenching or hardening transformation. The structure, observed by optical microscopy and X-ray diffraction, comprises a fine dispersion of spheroidal iron and chromium carbides of the formula $(Fe, Cr)_3 C$ and a diameter generally of less than 3 microns, these carbides being regularly embedded in a matrix consisting on the one hand of a solid solution over-saturated with carbon in iron, with a centered tetragonal crystalline structure, and on the other hand of a solid solution of carbon in iron which has a cubic crystalline structure with centered faces which is metastable at room temperature. There metallurgical component elements are called martensite (for the centered tetragonal shape) and austenite (for the cubic shape with centered faces).

As illustrated in FIG. 4, during the operation the very fine metal particles torn from the surface of the solid material by each abrasive grain are carried along by the thus filled fluid "+" towards a treatment station 2 where they are separated from the liquid phase and finally dried.

The following abrasive tools may be used alternatively:

Conventional grinding wheels consisting of abrasive grains such as silica or alumina, bonded by vitrified or organic binders, Abrasion tools consisting of cast iron of which the micrographic structure displays free carbides or definite high-hardness compounds.

The micrographic structure illustrated in FIG. 3 with a ×1,000 magnification of a finely polished sample of fibrous powder embedded in a polymerized material finely polished and subsequently attacked by means of a micrographic reagent consisting of a 3% nitric acid solution in ethyl alcohol, shows the dispersion of spherical shaped carbide particles in the martensitic matric. The adjacent particles of which the examined surface is not attacked by the reagent consist of carbides dispersed in an austenitic matrix. This phenomenon is due to the specific crystalline structure of this metallurgical component.

The diagram of FIG. 5 obtained by X-ray diffraction on a powder sample illustrates the presence of intensity peaks (impulses per second $\times 10^3$) corresponding to the austenitic structure. These peaks are denoted $\gamma$. The Bragg angle $\theta$ is plotted on the abscissa axis. The proportion of austenite, calculated according to known methods, ranges from 10% to 20% of the volume. This proportion depends notably on the cooling power of the liquid "1+" utilized during the process.

The powder characteristics result from the specific metallurgical structure of the powder, i.e.:

the presence of spherular iron and chromium carbide having the formula $(Fe, Cr)_3 C$ embedded in the matrix, which is attended by a reinforcement of the resistance to wear;

the presence of a predominantly martensitic structure having a high tensile strength, ranging in most instances from 1,200 MPa to 2,000 MPa in this type of steel;

the presence of austenite in the matrix, which is characterized in that, due to its crystalline shape, it accepts distortions and therefore increases the compressibility of the fibrous powder.

The granulometry and purity of the moist powders thus obtained (p) are dependent upon the selected abrasives. The use of conventional grinding wheels entails the presence in the powder of alumina or silica residues and also of vitrified or organic binders torn from the abrasive tool. A known method of phase-3 separation permits of purifying the powder before the drying operation (FIG. 4). However, it should be borne in mind that this phase-3 separation, intended for separating the abrasive particles, is not necessary for obtaining fibrous metal powder for use in the manufacture of friction linings. By way of example, this separation may be accomplished by magnetic sorting from iron powders. In the case of cast-iron base abrasive tools, these impurities do not exist.

The fibrous powders prepared according to this method are intended for obtaining at will:

either industrial products having an open metallic structure, of which the interparticulate free volume may be adjusted by applying a suitably selected pressing charge;

or composite industrial products having a metal skeleton, in which the interparticulate free volume is such that organic additives (such as polymerisable binding resins), inorganic additives or metallic additives can be added thereto.

The following examples given by way of illustration, not of limitation, describe mixtures from which brake linings may be manufactured:

EXAMPLE 1

| | |
|---|---|
| Dried fibrous steel powder | 65% |
| Friction additives for adjusting the coefficient of friction of the lining | 15% |
| Polymerisable phenol binder | 20% |

EXAMPLE 2

| | |
|---|---|
| Partially oxidized dried fibrous steel powder | 75% |
| Friction additive for adjusting the coefficient of friction of the lining | 15% |
| Polymerisable phenol binder | 10% |

EXAMPLE 3

| | |
|---|---|
| Partially oxidized dried fibrous steel powder | 79% |
| Friction additives for adjusting the coefficient of friction of the lining | 11% |
| Polymerisable phenol binder | 10% |

As illustrated in the above examples 1, 2 and 3, the proportion of steel powder may vary considerably. In fact, friction linings may contain from 30% to 85% by weight of fine fibrous steel powder, the balance to 100% consisting of fillers and binders. The precise proportion of each component element is adjusted as a function of the specific service properties contemplated for the friction lining.

By way of example, these fillers may consist of abrasive material, solid lubricants, noise and vibration absorbers, thermal stabilizers, or the like.

The above mixture is compressed in a suitable mold under moderate pressure and at room temperature to provide a pre-shape for the lining. This pre-shape is then molded to its final shape under low pressure and at a temperature of about 160° C.

The friction linings may also be obtained from short-fiber fibrous products of variable shapes.

In either case, the products thus obtained may comprise either an inordinate metallic skeleton, or an ordinate metallic skeleton, such as the one that would be obtained by using ferromagnetic particles oriented by an electromagnetic induction field applied previous to the binding of these particles.

What is claimed is:

1. A friction material usable as a friction lining for a brake or a clutch, said material having a high resistance to wear and consisting essentially of a mixture of:

30-85% by weight of quenched fibrous steel fibers which consist of a fine fibrous steel powder having a carbon content by weight ranging from 0.95% to 1.10% and a chromium content by weight ranging from 1.30% to 1.60%, said steel powder being quenched in such a manner that the micrographic structure observed in an examination plane intersecting a metal particle shows a fine distribution of iron and chromium spherular carbides having the formula $(Fe, Cr)_3C$ homogeneously disposed in a mixed matrix of high-strength martensite and 10–20% of metastable austenite in volume, the structural matrix of each steel fiber showing a high tensile strength ranging from 1,200 MPa to 2,000 MPa;

10–20% by weight of a thermosetting binder; and

5–30% by weight of a friction additive selected from the group consisting of abrasive material, solid lubricants, noise and vibration absorbers, thermostabilizers, polymerizable binders and metallic oxides or a mixture of such products.

2. The friction material of claim 1, wherein the thermosetting binder is a phenolic resin.

3. The friction material of claim 1, wherein the treated steel fibers have a loose density ranging from 0.2 to 1.5 g/cc.

4. The friction material of claim 1, wherein the treated steel fibers are compressed to a density higher than said loose density.

5. The friction material of claim 1, wherein the material contains about 65–80% by weight of said heat-treated fibrous steel fibers.

6. The friction material of claim 1, wherein the material contains about 10–15% by weight of said friction additive.

7. The friction material of claim 1, wherein the friction additive material is a divided carbon or powdered silica.

* * * * *